April 1, 1952  J. V. BERTRAND  2,591,230
PISTON SEAL
Filed Jan. 6, 1949
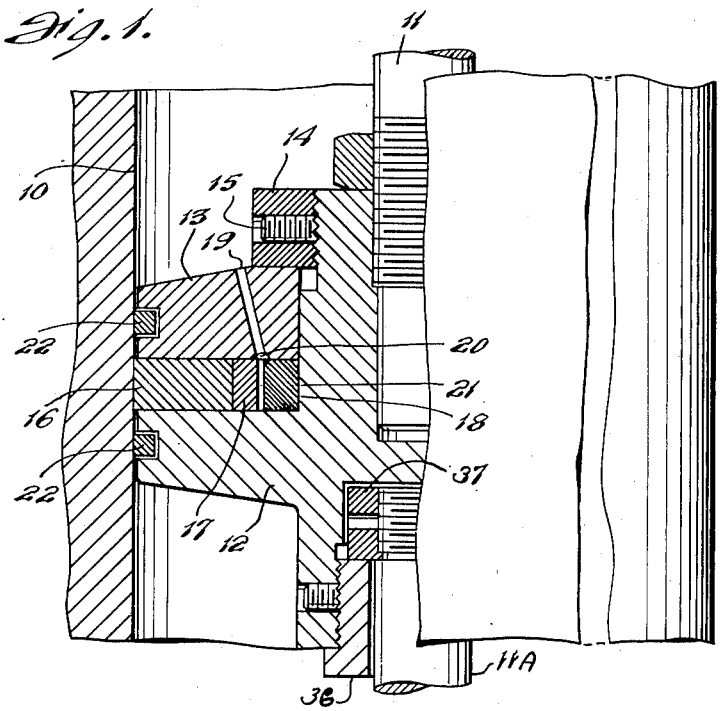
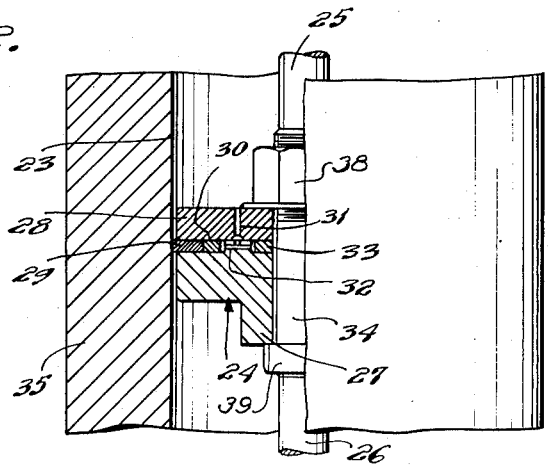
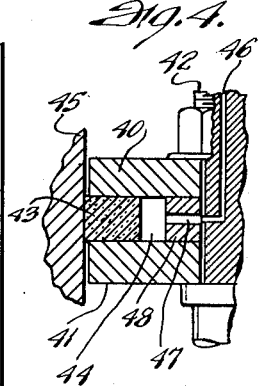
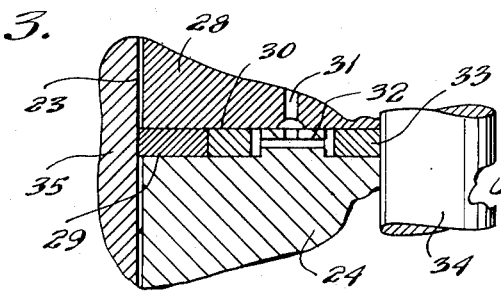
INVENTOR.
JOSEPH V. BERTRAND
BY
Hammond & Littell
ATTORNEYS Patented Apr. 1, 1952

2,591,230

UNITED STATES PATENT OFFICE 2,591,230

PISTON SEAL

Joseph V. Bertrand, Brooklyn, N. Y., assignor to Hydropress, Incorporated, New York, N. Y., a corporation of Delaware Application January 6, 1949, Serial No. 69,587

3 Claims. (Cl. 309—31)

This invention relates to a sealing arrangement for a reciprocable piston operating in a cylinder and particularly a cylinder wherein high pressures are involved.

The problem of adequately sealing a reciprocable piston in a vessel wherein pressures in the range of 20,000 to 30,000 lbs. per square inch are involved is difficult. Under such pressures, the elements of the cylinder expand and high stresses are placed on various parts of the mechanism.

One of the objects of the present invention is to provide a sealing arrangement for a reciprocable plunger which will prevent leakage under high pressure conditions.

Another object of the invention is to provide an arrangement whereby there will be a constant frictional resistance maintained between the sealing ring and a cylinder wall for all conditions of pressure within the cylinder.

One of the features of the invention is the use of a continuous or solid piston ring in conjunction with a piston, the ring and piston being arranged in relation to each other so that the ring preferably is in a prestressed condition when assembled in the cylinder before the cylinder is subjected to high pressure. In addition to this, means can be provided to utilize the pressure differential between the two sides of the piston to assist in forcing the piston ring against the cylinder wall whether prestressed or not, this feature being particularly important when the cylinder is expanded due to high pressure.

In one aspect of the invention, one or more auxiliary porous metal rings may be used on the piston on either side of the main prestressed sealing ring. The porous rings may be made of porous metal so that the pressure will be balanced on each side thereof, the pressure being balanced because of the porosity of the ring. The main piston ring also may be made of a porous metal.

When a continuous or solid piston ring is used, a resilient ring may be used in back thereof and subjected to high pressure without danger of the resilient ring squeezing through the split portion of a split ring. The loss of pressure by leakage due to expansion between the wall and piston ring is prevented by the use of the arrangement of the present invention.

In another aspect of the invention, a solid porous ring is contemplated with means leading a high pressure fluid behind the ring in its piston groove so that the pressure will balance any leakage tending to take place past the piston ring.

Another feature of the invention is the relating of radial thickness and other dimensions of the ring and the material thereof, so that the ring will expand or contract the same amount as the walls of the cylinder bore, the walls of the cylinder bore expanding or contracting in accordance with the pressure in the interior of the cylinder. By such an arrangement, the frictional resistance between the piston ring and cylinder wall will remain substantially constant. This will permit the motion of the piston to be more uniform. The leakage, if any, past the piston ring for a given pressure differential between the two sides of the piston is a function of the contact pressure between the ring and walls of the cylinder bore. When this contact pressure is kept constant, the leakage thus will be controlled, and if desired, taken into account in the operation of the device or cylinder.

These and other objects, advantages and features of the invention will become apparent from the following description and drawings.

Figure 1 is a fragmentary view partially in section showing one form of piston sealing arrangement.

Figure 2 is a fragmentary view partially in section of another form of the invention.

Figure 3 is an enlarged view of the sealing ring of Figure 2.

Figure 4 is a fragmentary view partially in section of a modified form of the invention.

In Figure 1, the cylinder walls 10 can form part of an apparatus which is to be used under high pressure conditions. Piston rod or pull rod 11 is connected to a piston 12. A piston disc 13 or flange is held in place on the piston 12 by means of a screw-threaded ring 14, said ring having a set screw 15 to lock the same in place. The piston disc 13 holds seal or piston ring 16 in position on the piston. Rod 11A is held in place by the engagement of screw-threaded collar 36 with nut 37 fastened onto the end of rod 11A.

Continuous piston ring 16 preferably is made slightly larger than the normal internal diameter of the cylinder when the cylinder is subjected to high pressure. The ring is thus in a prestressed or compressed condition when the cylinder is not subjected to pressure because of the compressive stress exerted thereon due to dimensional differences. Upon expansion of the cylinder due to pressure and/or heat, the ring will still tightly engage the walls as the piston reciprocates therein. The ring may be made of steel, brass or any other similar suitable metal having the desired modulus of elasticity.

Resilient ring 17 is located interiorly of the piston ring 16, said resilient ring being made of rubber or any other similar non-metallic substance. Said resilient ring 17 also may be made of a suitable resilient metallic material.

An internal ring or spacer 18 of any suitable material can be inserted on the piston 12. A passageway or conduit 19 is formed in flange 13 connecting with an annular groove 20 cut on the inside face of flange 13 for the purpose of leading pressure from the space on one side of the plunger into the space 21 back of resilient ring 17, and between said ring spacer 18. It is to be understood that spacer ring 18 can be replaced by other equivalent means such as a shoulder on piston 12 limiting the downward movement of disc 13 relative to the piston 12.

Auxiliary split rings 22 may be of a porous metal so as to prevent the building up of pressure behind said rings. The porous metal ring can be formed by powder metallurgy techniques. The porous metal will allow the free flow of fluid through the ring but will prevent dirt or other extraneous material from passing through the ring into the space in the groove behind the same.

A second form of seal arrangement is seen in Figure 2 wherein the cylinder walls 23 have a piston 24 reciprocable relative thereto. Pull or piston rod 25 has nut 38 cooperating with shoulder 39 for holding the parts in assembled relationship. The metal seal or piston ring 29 may be made with an outside diameter slightly larger than the diameter of the cylinder 23 when the apparatus is at rest so that the ring will be under a prestressed condition when assembled therewith. Resilient ring 30 (Figs. 2, 3) is mounted inside of metal sealing ring 29 in the space between the two discs 27 and 28. Ring 30 has pressure led thereto from one side of the piston through passages 31 and 32.

A second ring 33 may be mounted in such a position as to seal the passageway along the extension 34 of the piston and pull rod arrangement. As the cylinder expands under pressure, the prestressed condition of the piston ring will permit a proper seal to be maintained.

It is to be understood that the solid ring may be of the same diameter as the cylinder bore and the pressure on the resilient ring depended upon for forcing the solid ring outwardly to seal the piston relative to the cylinder.

In another form of the invention, piston elements 40, 41 (Fig. 4) may be mounted on pull rod 42. A solid porous metal piston ring 43 may be mounted in groove 44 formed between elements 40, 41, said ring contacting the walls of cylinder 45. A source of fluid is led through passage 46 to passage 47 through spacer 48. The fluid preferably is of such a pressure as to fill the pores of the ring 43 and prevent leakage of fluid in the vessel past said ring. The secondary fluid may be for example, a petroleum jelly or similar high viscosity substance. Such an arrangement also will serve to lubricate the piston. The secondary fluid may be led in various manners to the space behind the porous ring.

It is possible to arrange the piston ring so that there will be a constant frictional resistance by making the ring of the proper material and thickness.

If $a$ is considered to be the radius of the cylinder bore, and $b$ the outside radius of the cylinder, then the radial deformation of the bore $\Delta a_c$ because of internal pressure in the cylinder is:

$$\Delta a_c = P \frac{a}{E}\left[\frac{b^2-a^2}{b^2-a^2} - V\left(\frac{a^2}{b^2-a^2}-1\right)\right] \quad (1)$$

where

V=Poisson's ratio
E=modulus of elasticity

Then letting $a_r$=outside radius of the piston ring, C the inside radius of the ring, then the deformation $\Delta a_r$ of the outside radius of the ring is:

$$\Delta a_r = P\frac{a_r}{E}\left(\frac{2C^2}{a_r^2-C^2}\right) \quad (2)$$

In order for a constant contact pressure to exist between the outside face of the ring and the inside wall of the cylinder under varying pressure, the pressure P being the same for both cylinder and ring, it is apparent that $\Delta a_c$ must equal $\Delta a_r$.

From examination of Formulae 1 and 2 it is seen that each has a constant polynomial factor dependent upon material involved and dimensions. E and V will be constant as will be the radius for each element concerned. Simplifying 1 and 2

$$\Delta a_c = P \times A \quad (3)$$
$$\Delta a_r = P \times B \quad (4)$$

In order for $\Delta a_c$ to equal $\Delta a_r$ for all values of P, A must equal B, these latter being independent of pressure.

In establishing factor "B" we must also take into consideration that the outside radius of the ring must be slightly larger than the radius of the bore of the cylinder before assembly of the pores. The amount of the interference determines the amount of contact pressure between the outside diameter of the ring and the inside diameter of the cylinder when internal pressure is applied. With the aforementioned analysis, it has been estimated that if both the ring and cylinder are made of a material having a modulus of elasticity of 30,000,000 p. s. i. a Poisson's ratio of .26, the outside diameter of the cylinder 14½" and the inside diameter=6", the radial thickness of the ring should be about 0.99". The initial interference would be nearly 0.0001 on diameter for every 200 p. s. i. of contact pressure.

A piston sealing ring arrangement has been provided which can be used under high pressure conditions. The details of construction and materials can be varied without departing from the spirit of the invention except as defined in the appended claims.

What is claimed:

1. In a high pressure piston seal arrangement, the combination including a cylinder, a piston reciprocable in said cylinder, said piston having a plurality of grooves, a metal continuous seal ring in one of said grooves, said ring having a normal exterior diameter greater than said piston and cylinder when said cylinder is not subjected to pressure so that said ring is prestressed, a conduit connected to said groove leading pressure from one side of said piston to said groove adapted to force said ring outwardly in tight engagement with a cylinder wall as said wall expands under pressure, and a porous metal ring in another of said grooves spaced from said first mentioned groove.

2. In a high pressure piston seal arrangement, the combination including a cylinder, a piston reciprocable in said cylinder, a piston disc mountable on said piston, a spacer ring between said piston and piston disc, a metal continuous seal ring carried between said piston and disc, said seal ring having a normal greater outside diameter than the cylinder bore when the piston is not subjected to pressure so that said ring is in prestressed condition, a resilient ring inside of said seal ring between said piston and disc, and conduit means adapted to lead pressure from one side of said piston to an annular space at the inner face of said resilient ring, whereby the seal ring is maintained in close contact with a cylinder in which said piston is adapted to operate, said seal ring normal outside diameter being dimensioned relative to said cylinder to maintain said contact.

3. In a high pressure piston seal arrangement, the combination including a cylinder, a piston movable in said cylinder, said piston having a groove therein, a metal continuous annular seal ring carried in said groove of said ring, said seal ring having a normal greater outside diameter than the bore of said cylinder when the piston is not subjected to pressure so that said ring is in prestressed condition and conduit means connecting the space at the inner face of said resilient ring with the pressure on one side of said piston, the radial thickness and modulus of elasticity of said piston ring being chosen so that the pressure exerted on said inner face and said cylinder wall will result in substantially equal increments of radius change of said ring and cylinder as pressure is applied in said cylinder.

JOSEPH V. BERTRAND.

REFERENCES CITED

The following references are of record in the file of this patent:

UNITED STATES PATENTS

| Number | Name | Date |
|---|---|---|
| 311,380 | See | Jan. 27, 1885 |
| 831,603 | Davis | Sept. 25, 1906 |
| 2,213,523 | Jones et al. | Sept. 3, 1940 |
| 2,219,095 | Schuttler | Oct. 22, 1940 |